(12) United States Patent
Driggs et al.

(10) Patent No.: US 7,031,530 B2
(45) Date of Patent: Apr. 18, 2006

(54) COMPOUND CLASSIFIER FOR PATTERN RECOGNITION APPLICATIONS

(75) Inventors: Stanley W. Driggs, Vestal, NY (US); Elliott D. Reitz, II, Endicott, NY (US); Dennis A. Tillotson, Cortland, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 669 days.

(21) Appl. No.: 09/995,352

(22) Filed: Nov. 27, 2001

(65) Prior Publication Data

US 2003/0099401 A1    May 29, 2003

(51) Int. Cl.
*G06K 9/62* (2006.01)
(52) U.S. Cl. .................................... 382/228; 706/20
(58) Field of Classification Search ............. 382/228, 382/224, 227; 706/20
See application file for complete search history.

(56) References Cited

U.S. PATENT DOCUMENTS

| | | | | |
|---|---|---|---|---|
| 5,790,754 | A | * | 8/1998 | Mozer et al. ............. 704/232 |
| 5,832,108 | A | | 11/1998 | Fukita et al. ............. 382/159 |
| 5,835,633 | A | | 11/1998 | Fujisaki et al. ........... 382/187 |
| 5,835,635 | A | | 11/1998 | Nozaki et al. ............ 382/226 |
| 5,862,259 | A | | 1/1999 | Bokser et al. ............ 382/228 |
| 5,912,986 | A | * | 6/1999 | Shustorovich ........... 382/156 |
| 5,946,410 | A | | 8/1999 | Lyon ....................... 382/157 |
| 5,949,902 | A | | 9/1999 | Oberländer .............. 382/159 |
| 5,970,171 | A | * | 10/1999 | Baraghimian et al. ..... 382/187 |
| 5,974,163 | A | * | 10/1999 | Kamei ..................... 382/125 |
| 6,021,220 | A | | 2/2000 | Anderholm ............... 382/194 |
| 6,058,206 | A | | 5/2000 | Kortge .................... 382/159 |
| 6,823,323 | B1 | * | 11/2004 | Forman et al. ............ 706/20 |

FOREIGN PATENT DOCUMENTS

WO    WO9737327    10/1997

OTHER PUBLICATIONS

Fairhurst et al. "Approaches to the Optimisation of Pyramidal Architectures for Handwritten Character Recognition." IEE European Workshop on Handwriting Analysis and Recognition, Jul. 12, 1994, pp. 13/1-13/8.*
Vailaya et al. "Reject Option for VQ-Based Bayesian Classification." Proc. 15th Int. Conf. on Pattern Recognition, vol. 2, Sep. 3, 2000, pp. 48-51.*

(Continued)

*Primary Examiner*—Vikkram Bali
*Assistant Examiner*—Colin LaRose
(74) *Attorney, Agent, or Firm*—Tarolli, Sundheim, Covell & Tummino L.L.P.

(57) ABSTRACT

A method is disclosed for classifying an input pattern into an associated class through use of a compound classifier. Data pertaining to preselected features present within the input pattern are extracted. A discriminant value for each of a plurality of classes is then determined via a first classification technique. This value reflects the relative likelihood that a class is the associated class. The class with the highest relative likelihood is selected. A confidence value is generated via a second classification technique. This confidence value is reflective of the a posteriori probability that the selected class is the associated class. The selected class is rejected if the determined confidence value is below a predetermined threshold value.

19 Claims, 5 Drawing Sheets

OTHER PUBLICATIONS

A. F. R. Rahman et al. "An Evaluation of Multi-Expert Configurations for the Recognition of Handwritten Numerals", Pattern Recognition, Pergamon Press Inc., Elmsford, NY, vol. 31, No. 9, Sep. 1, 1998, pp. 1255-1273.

Xiafon Lin et al. "Adaptive Confidence Transform Based Classifier Combination for Chinese Character Recognition", Pattern Recognition, Letters, North-Holland Publ. Amsterdam, NL, vol. 19, No. 10, Aug. 1, 1998, pp. 975-988.

David J. Miller et al. "Ensemble Classification by Critic-Driven Combining" 1999 IEEE International Conference On Acoustics, Speech and Signal Processing, Phoenix, AZ, Mar. 15-19, 1999, IEEE (ICASSP), New York, NY; IEEE, US, vol. 2, Mar. 15, 1999, pp. 1029-1032.

Lei Xu et al. "Associative Switch for Combining Multiple Classifiers", Proceedings of the International Joint Conference on Neural Networks; Seattle, Jul. 8-12, 1991, International Joint Conference on Neural Networks, New York, IEEE, US, Jun. 8, 1991, pp. 43-48.

International Search Report PCT/US/ 02/29426.

* cited by examiner

COMPOUND CLASSIFIER FOR PATTERN RECOGNITION APPLICATIONS

BACKGROUND OF THE INVENTION

1. Technical Field

The invention relates to a pattern recognition device or classifier. Image processing systems often contain pattern recognition devices (classifiers).

2. Description of the Prior Art

Pattern recognition methods are particularly important in automatic control engineering and in machine text processing, for instance, in optical character recognition (OCR) readers of automatic letter distribution systems or the analysis of forms. For example, the text characters on an envelope can be located, parameterized, and classified by the system. Such a system may also have the capability of sorting the mail based on the results. Therefore there is significant financial incentive for improved classification techniques.

Recognition systems making use of pattern recognition devices are known. The key point is that a "feature vector" is formed to represent whatever is to be "classified" or recognized as associated with one of a plurality of output classes by the pattern recognition device. The system then takes whatever subsequent action is implied by the results. In postal processing systems the subsequent action is typically a revenue computation or mail sortation.

Using the example of a mail-piece indicia recognition system, the process begins with the image capture via a camera. The image is then preprocessed to locate the stamp(s), remove any rotation, and down-scale the identified section(s) of the image. Feature extraction converts each sub-image candidate into a vector of numerical measurements. Thus, the feature vector represents the image in a compact form. This vector is classified to produce a stamp ID (output classification, or class ID) using a pattern recognition device. Finally, the stamp ID is post-processed into the revenue present on the mail piece, and the system can use this to tally the total revenue processed in a given run (or day).

A preprocessing stage operates on the full image to enhance or change the image representation, and produce image segmentation. Image representation enhancement often includes binarization and filtering. Image segmentation identifies each candidate object within the larger image for subsequent recognition analysis. For example, to recognize the stamps on an envelope, the stamps are located and then recognized one at a time. Similarly, the characters of the address are recognized one at a time.

Feature extraction is performed on each candidate object to convert it from an image segment to a vector that represents that image segment. The vector is formed from a sequence of measurements performed on the image segment. Many feature types exist and are selected based on the characteristics of the recognition problem.

A classifier relates the feature vector to the most likely output class, and determines a confidence value that the actual image is a member of the selected class. Typical systems contain a statistical or neural network classifier. These techniques convert the feature vector input to a recognition result and an associated confidence value. The confidence value provides an external ability to assess the correctness of the classification. For example, a classifier may output a value between zero and one with one representing maximum certainty.

Several factors have large effects on the type of classifier design selected. One factor is the 'dimensionality' of the device. This is simply related to the number of elements in the feature vector, and the number of output classes. The number of classes directly ties to the application. For text-recognition there is the alphabet with uppercase and lower-case characters and some combinations (1 with 1, etc), typically resulting in fifty-six to seventy classes. For stamp recognition there are thousands of possible stamps but only a few are popular. One stamp-recognition project requires recognition of 160 stamps. A recent presort-label recognition device required five classes.

Another large factor in classifier selection is a trade-off between the performance of their recognition and confidence outputs. Techniques that perform extremely well at the recognition task, such as Bayesian distance measurements and standard backpropagation neural networks, usually do not produce very meaningful output confidence values. Techniques that produce good confidence measurements, such as radial basis functions, are often challenged to meet the recognition performance or introduce too many errors.

FIG. 1 shows a general configuration of a classifier 1 used by the most common techniques such as Bayes, radial basis function (RBF), and standard backpropagation neural networks. In this configuration, a discriminant function (e.g. 2A) is associated with each possible output class. Each discriminant function 2A–2N converts a feature vector 3 to a single measurement. A decision stage 4 compares the outputs 5A–5N of all of the discriminant functions to determine the strongest output (e.g. 5B). The index-number 6 of this strongest output corresponds to the output class, while the value of this output corresponds to the confidence 7 that the classification is correct.

There are many possible forms of discriminant functions and the needed training data depends on the selected base discriminant function. Within each discriminant function 2A–2N are parameters that are computed prior to runtime operation in a training model. In the training mode, the internal parameters are computed from a "training set" of feature vectors. To compute the training data, numerous representative image samples are needed for each output-class. The image samples are converted to vector-samples for training by simulating the front end of the system. The training data is simply a set of statistics extracted from these sample vectors.

Prior art systems exist that yield an optimum classifier, and a somewhat useful confidence measurement. However, a computer-based implementation is faced with a trade-off. Computing the full equation is processing intensive. Reducing the equation requires sacrificing the validity of either the classification or the associated output confidence value. This patent directly addresses this trade-off issue.

STATEMENT OF THE INVENTION

In accordance with one aspect of the present invention, a method is disclosed for classifying an input pattern into an associated class through use of a compound classifier. Data pertaining to preselected features present within the input pattern are extracted. A discriminant value for each of a plurality of classes is then determined via a first classification technique. This value reflects the relative likelihood that a class is the associated class. The class with the highest relative likelihood is selected. A confidence value is generated via a second classification technique. This confidence value is reflective of the a posteriori probability that the selected class is the associated class. The selected class is rejected if the determined confidence value is below a predetermined threshold value.

In accordance with another aspect of the present invention, a computer program product operative in a data processing system is disclosed for use in classifying an input pattern into an associated class. The computer program product includes a feature extraction routine for extracting data pertaining to preselected features present within the input pattern. A recognition portion is also present for determining a discriminant value for each of a plurality of classes via a first classification technique. The discriminant value reflects the relative likelihood that a class is the associated class. The recognition portion selects the class with the highest relative probability.

The program further includes a rejection portion for generating a confidence value via a second classification technique. The confidence value is reflective of the a posteriori probability that the selected class is the associated class. The rejection portion rejects the selected class if the determined confidence value is below a predetermined threshold value.

DETAILED DESCRIPTION OF THE INVENTION

Figure 1:
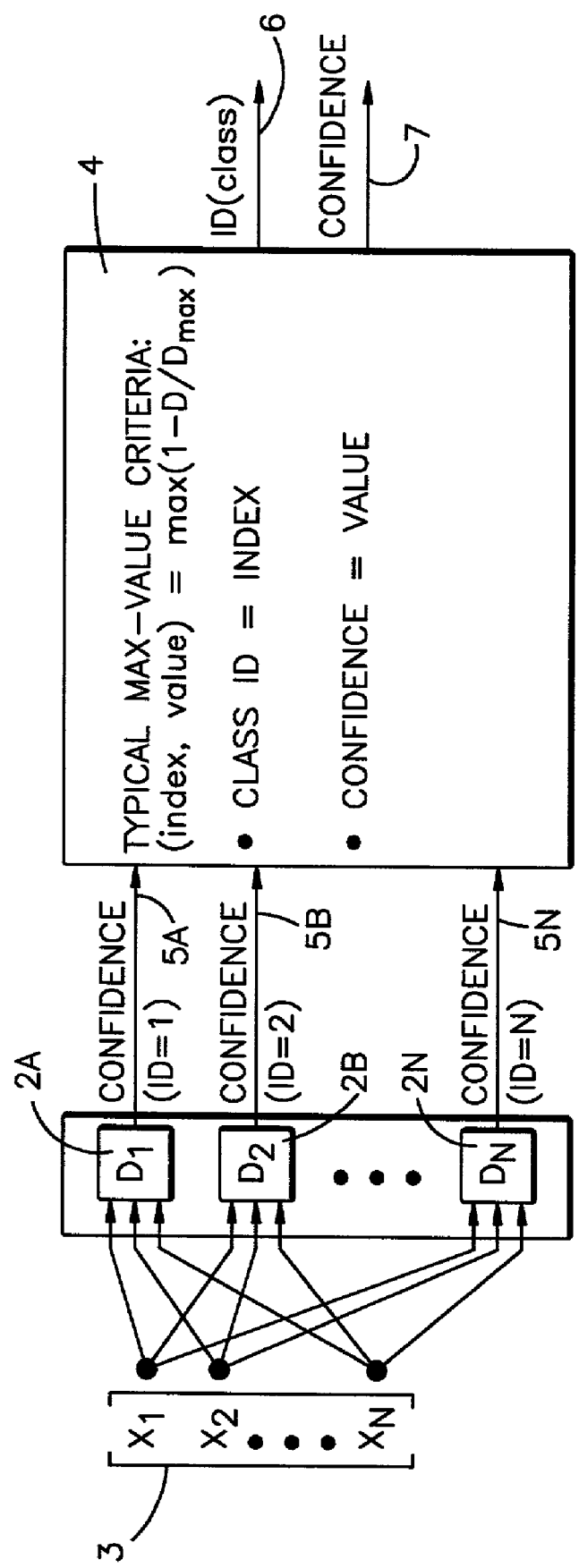
FIG. 1 is a functional schematic of a prior art classifier.

In accordance with the present invention, a compound pattern classification system and method is described. The classification method and system may be applied to any traditional pattern recognition task, including, for example, OCR (optical character recognition), speech translation, and image analysis in medical, military, and industrial applications.

The pattern recognition method set forth by the present invention makes it possible to achieve higher recognition and rejection performance without significant timing impacts when compared with a common one-stage technique. This is achieved by a method that preserves the reliability of the classification decisions together with the reliability of the output confidence values. To achieve this, a compound classifier is formed from two classification devices, a recognition classifier and a rejection classifier. This compound classifier solves the core problem by combining two techniques that are specialized at the extremes of recognition and rejection performance.

In particular, this technique was developed for proportional character recognition where a preprocessing stage often has errors in the segmentation of characters within the image. The confidence output from the classifier was designed so that the character segmentation can be re-tried until the postage address was fully recognized. This technique has also proven very valuable for postal stamp and indicia recognition.

A recognition classifier for the compound classifier is selected based on its recognition performance. Many of the classification techniques that are good at the recognition task produce meaningless confidence values. The normal problem with this situation is that the validity of the confidence value becomes relative rather than absolute and thus serves only the purpose of selecting the best classification. In this case, a confidence value will be separately computed, and the confidence values outputted from the recognition classifier will be ignored. The use of the relative classifier at the recognition stage significantly improves the computation requirements for run-time operation.

The internal architecture of a rejection classifier within the compound classifier differs significantly from that of prior art classifiers. Compared with the standard classifier architecture, there is no decision stage, and only one confidence value is computed. Selection of this technique is based on its confidence-measurement performance with the added requirement that the internal processing be partitioned by the output class. This way, the rejection classifier's computation time is reduced to a small fraction of the total time and becomes insignificant to the total classification time. Since the output class is already selected, there are no classification errors interjected by this device.

Thus, the requirements of this stage include internal partitioning so that a confidence value for a single class may be calculated independently and efficiently. The validity of the confidence value takes priority over the recognition performance that is disabled in this configuration.

It is assumed the classifier will be placed in an existing hardware application. In an example implementation of the classifier in a mail sorting system, mail is scanned as it passes the camera on a conveyor. Computers are networked to move the image into a node of a processing array. The computed results are returned to the conveyor hardware that diverts the mail according to the recognition result. If it's a stamp-recognition device, it may simply tally the revenue processed rather than diverting the mail. The recognition solution would typically contain the compound classifier software as well as feature extraction software, some pre-processing software and probably some post-processing software as well.

Figure 2:
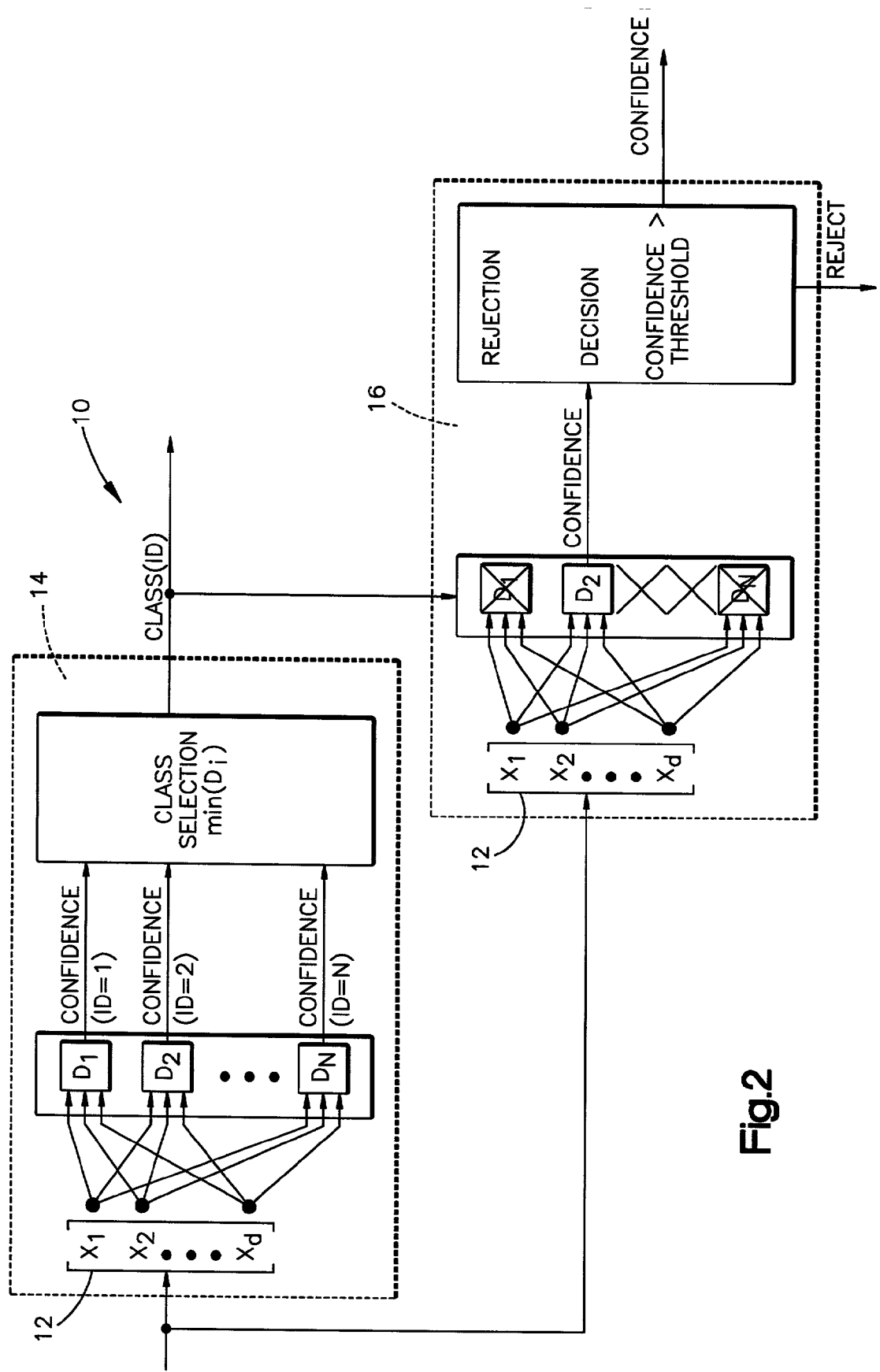
FIG. 2 is a functional schematic of the present invention.

FIG. 2 illustrates the internal architecture of the compound classifier 10. The classifier 10 receives a feature vector 12, which is processed by each of the two stages of the classifier 10. Initially, a recognition stage 14 of the classifier relates the inputted feature vector 12 to the most likely output class based upon existing training data. The recognition stage 14 utilizes a classification technique that is efficient in classifying individual inputs but cannot produce a useful confidence value. Once a class is chosen, the selected class is inputted to a rejection stage 16. The rejection stage 16 computes a confidence value based on the a posteriori probability that the inputted feature vector 12 is a member of the selected class. The decision of the recognition stage 14 is accepted or rejected based upon this confidence value.

Figure 3:
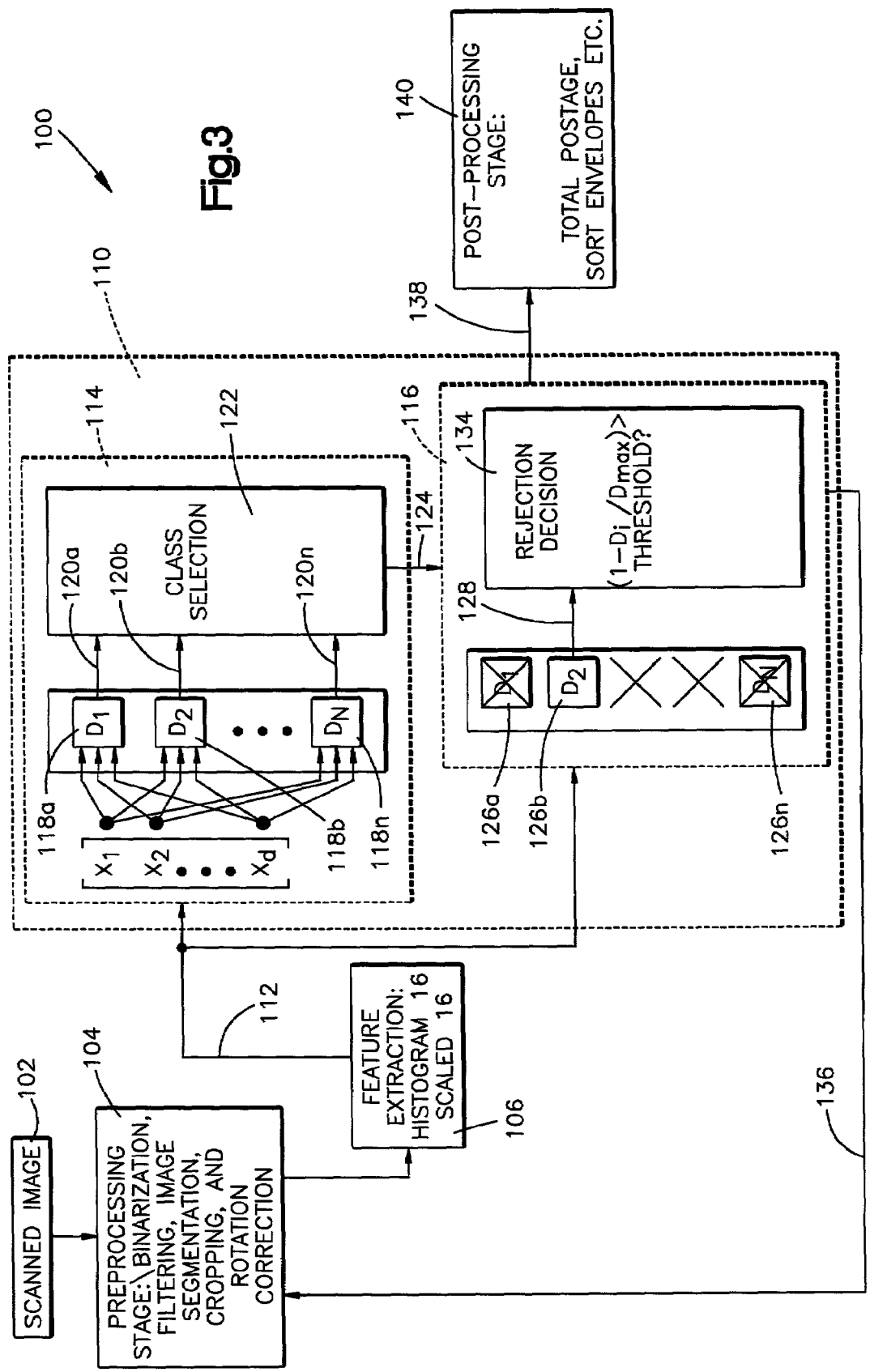
FIG. 3 is a block diagram of a representative system in which the present invention has been implemented.

An application of this process in the context of a mail sorting system is shown in FIG. 3. A mail system 100 is capable of accepting an envelope, locating any stamp thereon, and extracting the features from the stamp images. The claimed process is used in determining what types and/or values of stamps are present on the envelope. The system could check the mail for adequate postage or keep a running total of the postage value of a set of mail. As an alternate embodiment, text characters on the envelope can be located, parameterized, and classified by the system in accordance with the present invention. Once the zip code or city of destination has been determined, a system could sort the mail based on destination.

Focusing on the stamp recognition system illustrated in FIG. 3, the system 100 first produces a scanned image 102 of an input envelope. The scanned image 102 is input to a preprocessing stage 104, which filters the image and locates any stamps within the envelope image. The image is segmented to isolate the stamps into separate images and extraneous portions of the stamp images are cropped. Finally, any rotation of the stamp is corrected.

The pre-processed image progresses to a feature extraction stage 106, which generates data from selected features within the image. The selected features can be literally any quantifiable features discernible from the scan of the image that vary sufficiently among the various classes of images to serve as a basis for discriminating between them. Typically, these features will be selected prior to any training or application of the classifier. For the purposes of computation, the feature data can be treated as a feature vector 112. For ease of reference, the features reflected in the individual feature vector elements will be described as feature variables throughout. In the disclosed embodiment, a thirty-two element feature vector 112 is used, consisting of sixteen histogram feature variables, and sixteen "Scaled 16" feature variables.

The histogram portion of the feature vector 112 focuses on the grayscale value of the individual pixels. Each of the sixteen histogram feature variables represents a range of grayscale values. The values of the feature variables are derived from a count of the number of pixels in the image with a grayscale value within each range. By way of example, the first histogram feature variable might represent the number of pixels falling within the lightest sixteenth of the grayscale range. The feature variable values are normalized to a zero-to-one scale to facilitate later processing.

The "Scaled 16" variables represent average grayscale values of the pixels within sixteen preselected areas of the image. By way of example, the sixteen areas may be defined by a 4×4 equally spaced grid superimposed across the image. Thus, the first variable may represent the average or summed value of the pixels within the upper left region of the grid. Again, these feature variables are normalized to a zero-to-one scale for computational purposes.

Once the feature vector 112 has been extracted, it is inputted to a classification stage 110. Although in the preferred embodiment, the classification stage 110 is implemented as a portion of a single computer program, it is best conceptualized as two distinct stages or steps, a recognition stage 114 and a rejection stage 116.

The recognition stage 114 of the process relates the inputted feature vector to the output class to which it is most likely to belong based upon the known training data. Typically, this is the result of an optimization procedure, where the feature vector of the input is compared to ideal feature vectors of each of the classes to determine the closest fit.

In the illustrated example, each class has an associated discriminant function 118A–118N, which receives the extracted feature vector 112. Typically, within a particular classifier, each discriminant 118A–118N function will have the same basic form, varying from the others only as to certain parameters determined in training. Each discriminant function 118A–118N outputs a scalar discriminant value 120A–120N representative of the amount of deviation between its associated class parameters and the input vector 118. Accordingly, the class associated with the minimum discriminant value (e.g. 120B) will be selected by the system at a selection stage 122. The discriminant functions 118A–118N and the selection criteria will vary, however, with the classification technique used at this stage.

Within each discriminant function 118A–118N are parameters, such as the above mentioned ideal class vector, that are computed prior to runtime operation. In a training mode, the internal parameters are computed from a training set of feature vectors that are derived from sample images for each class. There are a number of acceptable classification techniques and the needed training data depends on the associated base discriminant function of the chosen technique, the number of output classes, and the selected features. Accordingly, the time and sample size necessary for training varies widely and often influences the selection of a classification technique.

In accordance with the present invention, the classification technique utilized for the recognition stage 114 will be selected to maximize recognition accuracy at the expense of accuracy in producing a confidence value. Specifically, the recognition stage 114 will either make use of a classification technique with strong recognition capabilities but limited ability to generate useful confidence values or a known technique will be modified to produce a discriminant value (e.g. 120A) meaningful only relative to the other discriminant values (e.g. 120B–120N). Regardless of the method used, the result is a relative discriminant value (e.g. 120A), which retains meaning for comparison within the classes, but cannot be used to produce an useful absolute confidence value. By way of example, a set of relative discriminant functions can be produced by modifying a known classification technique to exclude all common-mode terms among its discriminant functions (i.e. eliminating all terms that do not vary among the classes). It should be noted, however, that the term "relative," is also intended here to apply to functions from known techniques that do not produce a useful confidence value.

In the disclosed embodiment, a modified Mahalanobis distance classifier is used at the recognition stage 114. In a prior art Mahalanobis distance classifier, the base discriminant function is:

$$D_i=(x-u_i)K_i^{-1}(x-u_i)^T, \text{ where} \quad \text{[Equation (1)]}$$

$D_i$ =the discriminant function of one output class i (square of the Mahalanobis distance)

x=the input feature vector, representative of the image to be classified $u_i$=an ideal class vector, where each element is equal to the mean of the corresponding feature variable across the sample input feature vectors for class i (i.e. each element is equal to the expected value of the corresponding element of x, $E(x_n)$ across the vectors in class i)

$K_i^{-1}$=the inverse of a covariance matrix derived from the sample feature vectors of class i, used to correct for interrelations among the various feature Often, the covariance matrix $K_i$ for a particular class will possess singularities. A singular matrix does not have a calculable inverse. To avoid such cases, a generic $K^{-1}$ may be used where K is a weighted average of the covariance matrix of each class with weights based on the a priori probability of a random input vector falling within each class. Using this value for the covariance matrix, the base discriminant function from equation (1) may be expressed as:

$$D_i=(x-u_i)K^{-1}(x-u_i)^T \quad \text{[Equation (2)]}$$

Additionally, the Moore-Penrose psuedoinverse can be used to solve the inversion problem caused by singularities within a covariance matrix.

In this form, a Mahalanobis distance measurement yields the optimum Bayesian classifier and a useful confidence measurement. The confidence measurement can be obtained as follows:

$$\text{Confidence} = \max(1 - D_i/D_{imax}), \text{ where} \quad \text{[Equation (3)]}$$

$D_{imax}$=The maximum value expected for $D_i$, obtained from the sum of the maximum values expected for each element of $|x-u|$ While it is possible to obtain useful confidence values in this manner, computing the full Mahalanobis discriminant function for each class is processing intensive. A considerable amount of processing time can be saved by reducing the equation, but any reduction requires sacrificing either the validity of the classification or the accuracy of the associated output confidence value.

In accordance with the present invention, for the purposes of making the initial classification, the classifier will not attempt to produce a useful confidence value at the recognition stage 114. Consequently, the discriminant functions 118A–118N for the recognition stage 114 can be simplified and the necessary computation time can be sharply reduced.

In the case of the Mahalanobis distance classifier described above, the discriminant functions 118A–118N can be reduced by eliminating their common mode terms. Note that a covariance matrix and its inverse are symmetric square matrices. The base discriminant function from equation (2) may therefore be written as:

$$D_i = xK^{-1}x^T - 2u_i K^{-1}x^T + u_i K^{-1}u_i^T \quad \text{[Equation (4)]}$$

The first term above is a common mode term; it is constant for a given input vector. In accordance with the present invention, this term need not be calculated. The third term does not vary according to the input feature vector x. Consequently, it may be computed and stored during the training stage as a scalar value for each class. In the second term, the quantity $-2u_i K^{-1}$, which ordinarily requires a computationally intensive matrix multiplication can be pre-calculated and stored as a vector for each class during training. Accordingly, the run time calculation of discriminant function reduces to the matrix multiplication of two vectors for each class. In fact, the entire recognition stage can be conceived as a single matrix multiplication of an matrix representing the training data for every class by the transposed feature vector. While the Mahalanobis distance classifier is only one of several techniques with which the present invention can be implemented, it provides an example of the processing time that can be saved at the recognition stage 14 using the claimed process.

Once the class with the minimum associated discriminant value (e.g. 120B) has been selected, it is input 124 to the rejection stage 116. In the rejection stage 116, it is necessary to use a classification technique that produces a meaningful confidence value. In the illustrated embodiment, the rejection stage will, like the recognition stage above, have N discriminant functions 126A–126N, each corresponding to one of the N classes. As described above, however, a confidence value will be computed only for the selected class. Thus, in order to realize a savings of computation time, the classification technique selected for the rejection stage 116 must meet the added requirement that its processing be partitioned by the output class (i.e. computing a confidence value for one class does not require computing confidence values for every class). Since only one confidence value is needed, computation time can be saved by using a technique that computes useful confidence values, even if it would be too inefficient for use for all of the class computations. As an example, suitable discriminant formulas can be adapted from techniques based on radial basis functions.

Continuing with the illustrated example, a discriminant value 128 suited to producing a useful confidence value can be obtained via the following formula:

$$D_i = \sum_{j=1}^{m} \left( \frac{|x_j - u_{ij}|}{\sigma_{ij}} \right) \text{ where, } i = \text{the class selected by the recognition stage} \quad \text{[Equation (5)]}$$

$x_j$=the $j^{th}$ element of input feature vector x
$u_{ij}$=the $j^{th}$ element of the ideal feature vector from class i.
$\sigma_{ij}$=the standard deviation of the feature variable corresponding to the $j^{th}$ element of the feature vector across the sample feature vectors in class i.

The discriminant value 128 is easily transformed into a classification confidence value similar to a probability:

$$\text{Confidence} = (1 - D_i/D_{imax}), \text{ where} \quad \text{[Equation (6)]}$$

$D_{imax}$=The maximum value expected for $D_i$, obtained from the sum of the maximum values expected for each element of $|x-u|$ The maximum value for the confidence discriminant value 128 is often more useful when the maximum value of each error term (i.e. $|x_j - u_{ij}|/\sigma$) is limited by non-linear clipping. A clipping value may be determined by experimentation or related to a statistical value (i.e. clipping value=a number * the standard deviation of the feature variable). For the purposes of the example embodiment, it has been determined that a clipping value of seven for the error term, $|x_j - u_{ij}|/\sigma$, works well. When a clipping value is used, $D_{imax}$ simply becomes the sum of the clipping values of the feature variables.

The confidence discriminant value 128 is passed to a decision portion 134 of the rejection stage 116, where the confidence value is calculated and compared to a threshold. Where the threshold is not met, the classification value is rejected. In the stamp classification above, rejected images often result from errors in the image segmentation process described above. Consequently, rejected images result in a signal 136 to the preprocessing stage of the system 102 to reprocess the envelope with different image segmentation.

Where the confidence exceeds the threshold, the classification result 138 is sent to the final stage in the stamp recognition system, the post-processing stage 140. The post-processing stage is simply the application of the information gained in the classification stage 110 to a real world problem. In the example embodiment, the data is used simply to maintain a total of the incoming postage. Other tasks for the post-processing portion should be apparent to one skilled in the art.

Figure 4:
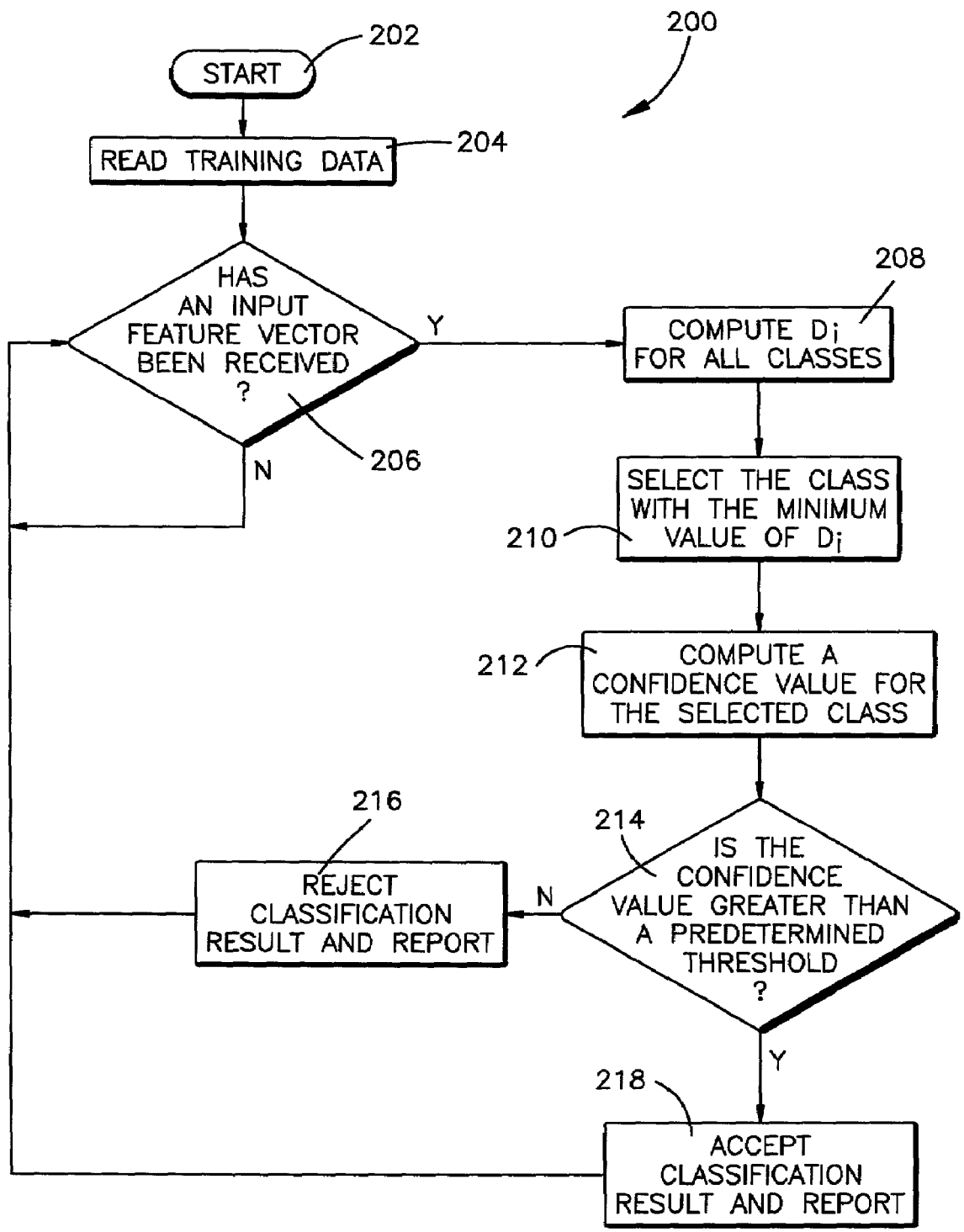
FIG. 4 is a flow diagram of the run-time operation of the present invention.

The run-time operation 200 of the classifier 10 is illustrated in FIG. 4. The program commences at step 202 and proceeds to step 204. In step 204, the process reads the stored training data for each class. The program then proceeds to step 206, where it waits for the input of a feature vector 12. So long as the program does not detect the input of a feature vector 12, the program remains at step 206. Upon receipt of the feature vector 12, however, the program proceeds to step 208.

In step 208, the program computes a discriminant value for each class, reflective of the relative likelihood that a class is the class associated with the input pattern. The program then advances to step 210, where the most likely class is selected. The program then proceeds to step 212. In step 212, the program computes a confidence value for the selected class, reflecting the a posteriori probability that the selected class is the class associated with the input pattern. The program then advances to step 214.

In step 214, the program determines whether the computed confidence value from step 212 exceeds a predetermined threshold. If the threshold is exceeded, the program advances to step 216, where the classification is accepted. The program then returns to step 206 to await the input of another pattern. If the confidence threshold in step 214 is not exceeded, the program proceeds to step 218, where the classification result is rejected. The program then returns to step 206 to await another input pattern.

Figure 5:
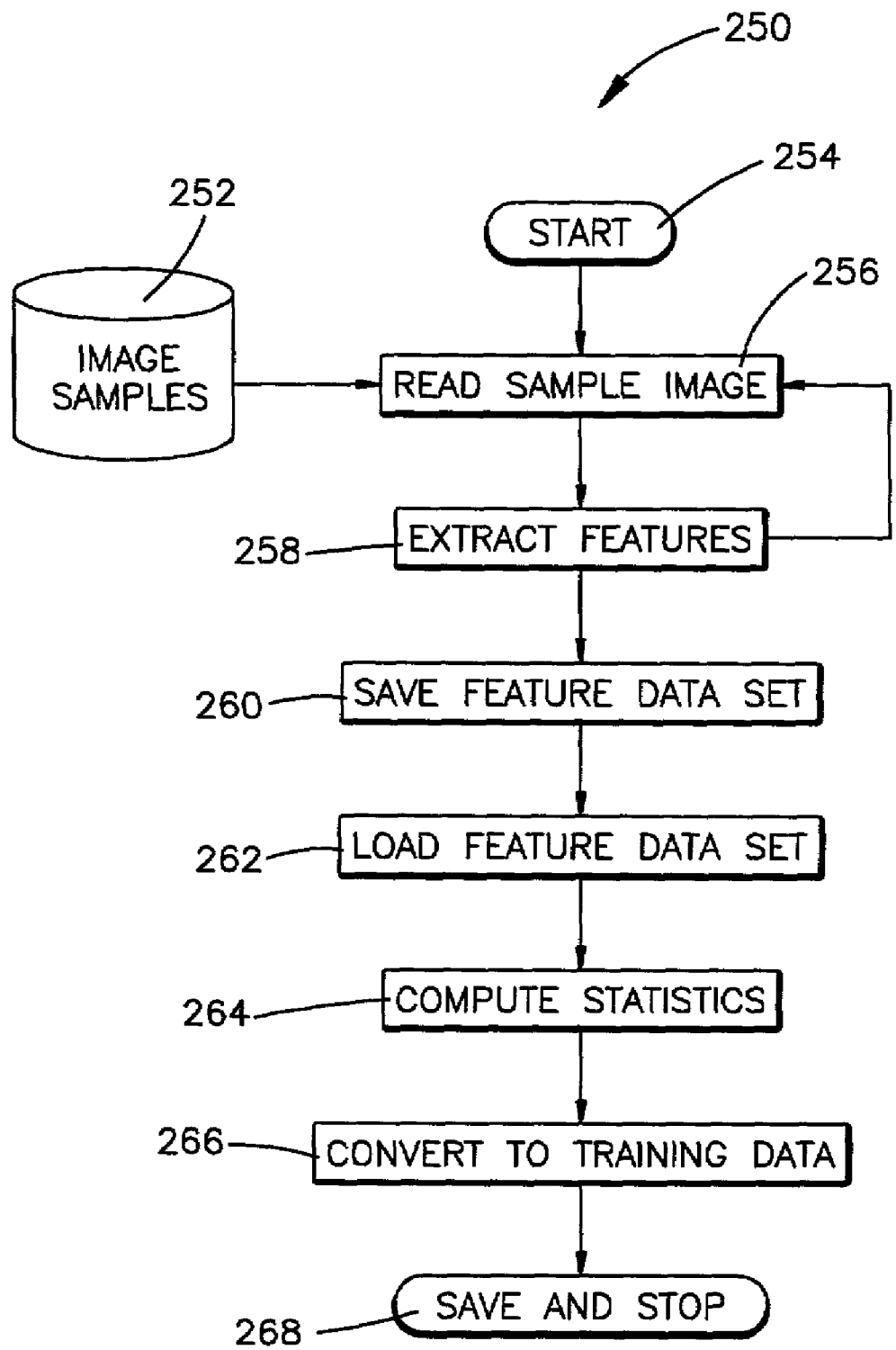
FIG. 5 is a flow diagram of the training process in the present invention.

FIG. 5 shows a flow-chart illustrating the operation of a computer program 250 used to train the compound classifier device via computer software. Prior to training, the trainer gathers a sufficient number of sample images 252 and categorizes them (via human judgement). The number of training images is variable. The number of output classes, selected features, and classifier types directly affect the number of samples needed for good results. Depending on the device, too many samples can be problematic, as it can take too long to process the training data without a significant gain in performance.

The actual training process begins at step 254 and proceeds to step 256. At step 256, the program retrieves a sample image from memory. The process then proceeds to step 258, where the images are converted into the feature vector inputs that the classifier would see if it were in a normal run-time operational mode. After each sample feature vector is extracted, the results are stored, and the process returns to step 256. After all of the samples are analyzed, the process proceeds to step 260, where the feature vectors are saved as a set.

The actual computation of the training data begins in step 262, where the saved feature vector set is loaded into memory. After retrieving the feature vector set, the process progresses to step 264. At step 264, the program calculates statistics, such as the mean and standard deviation of the feature variables for each class. Intervariable statistics are also calculated, including the covariance matrix of the sample set for each class. The process then progresses to step 266 where it uses the set of feature vectors to compute the training data. At this step, an inverse covariance matrix would be calculated, as well as various fixed value terms for the recognition classification. After these calculations are performed, the process proceeds to step 268 where the training parameters are stored in memory and the training process ends.

This process produces the internal parameters needed by the classifier stage. Usually training would occur prior to sale to a customer. However, one system currently in development will actually require customer re-training (for maintaining the stamps in circulation to be recognized). In applications such as text-character recognition, the classes are permanently fixed and customer retraining isn't necessary.

It will be understood that the above description of the present invention is susceptible to various modifications, changes and adaptations, and the same are intended to be comprehended within the meaning and range of equivalents of the appended claims. In particular, it is expected that the classification techniques used in the two stages may be varied without deviating from the intentions and principles of this invention.

Having described the invention, we claim:

1. A method of classifying an input pattern into an associated class, comprising:
    extracting data pertaining to preselected features present within the input pattern;
    determining, via a first classification technique, a discriminant value for each of a plurality of classes reflecting the relative likelihood that a class is the associated class;
    selecting a class with the highest relative likelihood;
    generating, via a second classification technique, a confidence value reflective of the a posteriori probability that the selected class is the associated class, the second classification technique using a modified radial basis function to compute the confidence value; and
    rejecting the selected class if the determined confidence value is below a predetermined threshold value.

2. A method as set forth in claim 1 wherein the first classification technique uses a modified Bayesian distance function to compute the discriminant values.

3. A method as set forth in claim 1 wherein the input pattern is a scanned image.

4. A method as set forth in claim 3 wherein each of the plurality of output classes represents a variety of postage stamp.

5. A method as set forth in claim 3 wherein each of the plurality of output classes represent an alphanumeric character.

6. A method as set forth in claim 3 wherein the step of extracting the feature data includes dividing the image into regions and summing the grayscale values of the pixels within each region.

7. A method as set forth in claim 3 wherein the step of extracting the feature data includes defining a discrete number of grayscale ranges and determining the number of pixels within the image that fall within each range.

8. A method as set forth in claim 1 wherein the input pattern is an audio recording.

9. A computer program product embodied in a computer-readable medium operative in a data processing system for use in classifying an input pattern into an associated class, the computer program product comprising:
    a feature extraction portion for extracting data pertaining to preselected features present within the input pattern;
    a recognition portion for determining, via a first classification technique, a discriminant value for each of a plurality of classes reflecting the relative likelihood that a class is the associated class and for selecting a class with the highest relative probability; and
    a rejection portion for generating, via a second classification technique that is partitioned to calculate a confidence value only for a single class, a confidence value reflective of the a posteriori probability that the selected class is the associated class and for rejecting the selected class if the determined confidence value is below a predetermined threshold value.

10. A computer program product embodied in a computer-readable medium as set forth in claim 9 wherein the recognition portion makes use of a Bayesian distance classifier to compute the discriminant values.

11. A computer program product embodied in a computer-readable medium as set forth in claim 9 wherein the rejection portion uses a radial basis function to compute the confidence value.

12. A computer program product embodied in a computer-readable medium as set forth in claim 9 wherein the input pattern is a scanned image.

13. A computer program product embodied in a computer-readable medium as set forth in claim 12 wherein each of the plurality of output classes represent a variety of postage stamp.

14. A computer program product embodied in a computer-readable medium as set forth in claim 12 wherein each of the plurality of output classes represent an alphanumeric character.

15. A computer program product embodied in a computer-readable medium as set forth in claim 12 wherein the feature extraction portion divides the image into regions and sums the grayscale values of the pixels within each region.

16. A computer program product embodied in a computer-readable medium as set forth in claim 12 wherein the feature extraction portion defines a discrete number of grayscale ranges and determines the number of pixels within the image that fall within each range.

17. A method of classifying an input pattern into an associated class, comprising:

extracting data pertaining to preselected features present within the input pattern;

determining, via a first classification technique, a discriminant value for each of a plurality of classes reflecting the relative likelihood that a class is the associated class;

selecting a class with the highest relative likelihood;

generating, via a second classification technique, a confidence value reflective of the a posteriori probability that the selected class is the associated class, the second classification technique being partitioned to calculate a confidence value only for a single class; and rejecting the selected class if the determined confidence value is below a predetermined threshold value.

18. A method as set forth in claim 17 wherein each of the plurality of output classes represent a variety of postage stamp.

19. A method as set forth in claim 17, wherein the second classification technique uses a modified radial basis function to compute the confidence value.

* * * * *